US009785366B1

(12) United States Patent
Morley et al.

(10) Patent No.: US 9,785,366 B1
(45) Date of Patent: Oct. 10, 2017

(54) UNBUFFERED LOG-STRUCTURED STORAGE

(71) Applicant: EMC Corporation, Hopkinton, MA (US)

(72) Inventors: Steven Morley, Mendon, MA (US); Daniel Cummins, Hudson, NH (US); Peter Puhov, Shrewsbury, MA (US); Walter O'Brien, Westborough, MA (US); Sudhir Srinivasan, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 14/984,864

(22) Filed: Dec. 30, 2015

(51) Int. Cl.
G06F 12/00 (2006.01)
G06F 3/06 (2006.01)
G06F 12/02 (2006.01)

(52) U.S. Cl.
CPC ............ G06F 3/0619 (2013.01); G06F 3/061 (2013.01); G06F 3/064 (2013.01); G06F 3/065 (2013.01); G06F 3/0685 (2013.01); G06F 12/0238 (2013.01)

(58) Field of Classification Search
CPC ........ G06F 3/0619; G06F 3/061; G06F 3/064; G06F 3/065; G06F 3/0685; G06F 12/0238
See application file for complete search history.

(56) References Cited

U.S. PATENT DOCUMENTS

| 6,611,852 | B1 | 8/2003 | Morley et al. | |
|---|---|---|---|---|
| 9,069,682 | B1 | 6/2015 | Veeraswamy | |
| 2010/0153617 | A1* | 6/2010 | Miroshnichenko | G06F 3/061 711/6 |
| 2016/0253104 | A1 | 9/2016 | Romanovskiy | |

OTHER PUBLICATIONS

Daniel Cummins, et al.; "Techniques for Increasing Storage System Performance in Drocessor-Bound Workloads With Large Working Sets and Poor Spatial Locality," U.S. Appl. No. 14/230,118, filed Mar. 31, 2014.
Vamsi Vankamamidi, et al.; "Using Spare Disk Drives to Overprovision Raid Groups," U.S. Appl. No. 14/870,187, filed Sep. 30, 2015.
Vamsi Vankamamidi, et al.; "Log Cleaning and Tiering in a Log-Based Data Storage System," U.S. Appl. No. 14/984,060, filed Dec. 30, 2015.
Datrick O'Neil, et al.; "The Log-Structured Merge-Tree (LSM-Tree)," Acta Informatica, 1996, pp. 351-385 (presented as 32 pages), vol. 33, Issue 4.
Mendel Rosenblum, et al.; "The Design and Implementation of a Log-Structured File System," ACM Transactions on Computer Systems, Feb. 1992, pp. 26-52, vol. 10, No. 1.

* cited by examiner

Primary Examiner — Shawn X Gu
(74) Attorney, Agent, or Firm — BainwoodHuang

(57) ABSTRACT

A method of writing data to persistent storage includes (a) for each data block of a set of data blocks, storing data of that data block at an offset within a log segment of the persistent storage in conjunction with a logical block address (LBA) of that data block on the persistent storage, a size of the log segment being larger than a size of each data block, (b) identifying a particular log segment of the persistent storage that has become filled with data blocks, and (c) upon identifying the particular log segment as having become filled, inserting pointers to respective data blocks stored within the particular log segment into respective locations defined by the respective LBA of each respective data block within a map tree.

20 Claims, 4 Drawing Sheets ial U.S. 9,785,366 B1

UNBUFFERED LOG-STRUCTURED STORAGE

BACKGROUND

Log-structured storage systems are used to quickly write data to disk. In a conventional implementation using traditional rotating platter magnetic hard disk drives, it is beneficial to queue up writes in a buffer and then write the entire buffer to a single location on disk once the buffer is full as a log segment on disk. Individual blocks of the log segment may then be logically inserted into a map tree in order to provide logical block addressing. Since random writes are essentially turned into sequential writes to the log segment, this approach allows for increased write speed for random writes, due to the fact that random writes require many seek operations, which are comparatively slow on traditional rotating platter magnetic hard disk drives.

In order to provide fault-tolerance against power failures, the buffer is queued up in non-volatile memory, such as battery-backed RAM. This allows write back caching to be employed with fault tolerance, improving performance without the risk of a power failure.

SUMMARY

Although conventional log-structured storage systems perform well, it would be desirable to eliminate the need for expensive battery-backed RAM and other expensive non-volatile memories. Due to the rise in popularity of solid state storage devices (SSD), such as flash drives, there is no longer a significant performance penalty for small writes when SSDs are employed.

Thus, it is possible to provide improved fast log-structured storage using SSDs without using a non-volatile memory buffer. This is done by writing blocks directly to log segments on the SSD as writes come in and waiting to insert the blocks into the map tree until the log segments are filled. Further benefits can be obtained by maintaining several open segments in parallel for different streams.

In one embodiment, a computer-implemented method performed by a computing device, of writing data to persistent storage is disclosed. The method includes (a) for each data block of a set of data blocks, storing data of that data block at an offset within a log segment of the persistent storage in conjunction with a logical block address (LBA) of that data block on the persistent storage, a size of the log segment being larger than a size of each data block, (b) identifying a particular log segment of the persistent storage that has become filled with data blocks, and (c) upon identifying the particular log segment as having become filled, inserting pointers to respective data blocks stored within the particular log segment into respective locations defined by the respective LBA of each respective data block within a map tree. An apparatus and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to faster log-structured storage using SSDs without using a non-volatile memory buffer. This is done by writing blocks directly to log segments on the SSD as writes come in and deferring insertion of the blocks into the map tree until the log segments are filled. Further benefits can be obtained by maintaining several open segments in parallel for different streams.

Figure 1:
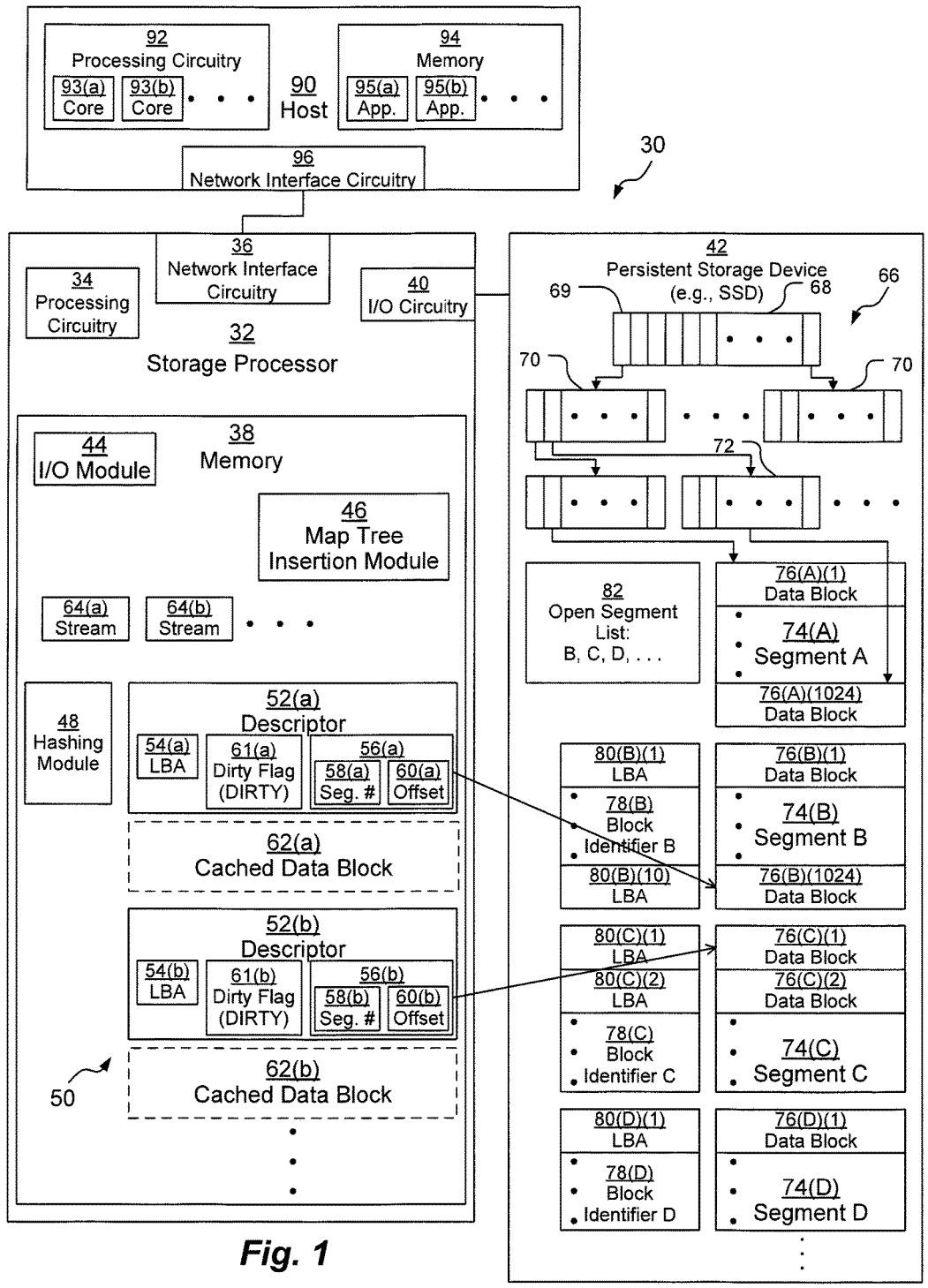
FIG. 1 is a block diagram depicting an example system and apparatus for use in connection with various embodiments.

FIG. 1 depicts a data storage system 30 connected to one or more hosts 90. System 30 includes a storage processor 32 (although this is by way of example only; other types of computing devices are also possible) and at least one persistent storage device 42.

Storage processor 32 includes processing circuitry 34, network interface circuitry 36, input/output (I/O) circuitry 40, and memory 38. In a typical arrangement, a storage processor 32 is configured as a board or enclosure mounted within a rack connected to a set of disks (including persistent storage device 42) also mounted within the rack. These components, in combination, may make up data storage system 30. In some embodiments (not depicted), data storage system 30 may include two or more storage processors 32.

Processing circuitry 34 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 36 may include one or more Ethernet cards, cellular modems, Fibre Channel (FC) adapters, Wireless Fidelity (Wi-Fi) wireless networking adapters, and other devices for connecting to a network (not depicted), such as a storage area network (SAN), local area network (LAN), wide area network (WAN), cellular data network, etc. Network interface circuitry 36 is able to communicate with a host 90. In a typical arrangement, host 90 (which includes processing circuitry 92, memory 94, and network interface circuitry 96) runs a set of applications 95 (depicted as applications 95(a), 95(b), . . . ) on one or more processing cores 93 (depicted as cores 93(a), 93(b), . . . ) of its processing circuitry, the applications 95 being stored within memory 94 during execution. In operation, applications 95 running on host 90 send data storage commands to storage processor 32 in order to read from and write to persistent storage device 42. In some embodiments (not depicted), one or more of applications 95 sending storage commands relating to persistent storage device 42 may execute directly on storage processor 32 itself without need for an external host 90.

I/O circuitry 40 is configured to connect to a storage interconnect bus (e.g., via a backplane) to enable communication with disks of the system 30, including persistent storage device 42. The storage interconnect bus may include one or more of a Fiber Channel, SCSI, Serial Attached SCSI, ATA, Serial ATA, mSATA, PCIe, M.2, or other similar storage buses for communicating with storage.

Memory 38 may be any kind of digital system memory, such as, for example, random access memory (RAM). Memory 38 stores one or more operating systems in operation (not depicted, e.g., Linux, UNIX, Windows, MacOS, or a similar operating system), various applications executing on processing circuitry 34 as well as data used by those applications.

As depicted, memory 38 includes I/O module 44, map tree insertion module 46, and hashing module 48 as well as a storage cache portion 50. Memory 38 may also include representations of one or more stream 64 (depicted as streams 64(a), 64(b), . . . ).

A stream represents an ordered collection of data storage commands that are related in some way. For example, in one embodiment, all data storage commands from a first application 95(a) are grouped into a first stream 64(a), while all data storage commands from a second application 95(b) are grouped into a second stream 64(b). In another embodiment, all data storage commands from a first core 93(a) are grouped into first stream 64(a), while all data storage commands from a second core 93(b) are grouped into second stream 64(b). If there are more than two cores 93 or applications 95, their respective data storage commands may be grouped into more than two streams 64 (not depicted). In another embodiment, software running on processing circuitry may divide received data storage commands into streams based on characteristics of the commands. For example, random writes (i.e., write commands that are directed towards blocks having logical addresses that are not sequential) may be segregated into a random stream 64, while sequential writes (or writes which tend to be primarily sequential) may be placed into one or more sequential streams 64.

In some embodiments, memory 38 may also include a persistent storage portion (not depicted). Persistent storage may be made up of one or more persistent storage devices, such as, for example, hard disk drives, solid-state storage devices, flash drives, etc. Persistent storage is configured to store programs and data even while the storage processor 32 is powered off. The OS (e.g., Linux, UNIX, Windows, or a similar operating system) and the applications (e.g., modules 44, 46, 48) are typically stored in persistent storage so that they may be loaded into memory 38 from persistent storage upon a system restart. These applications, when stored in non-transient form either in the volatile portion of memory 38 or in persistent storage, form a computer program product. The processing circuitry 34 running one or more of these applications thus forms a specialized circuit constructed and arranged to carry out the various processes described herein.

Persistent storage device 42 may be any kind of storage device able to persistently store data, such as, for example, one or more magnetic hard disk drives or solid state storage devices (SSD), etc. However, in a preferred embodiment, persistent storage device 42 is an SSD or a set of SSDs in a RAID configuration.

Persistent storage device 42 stores a map tree 66, an open segment list 82, and a set of log segments 74. In some embodiments, persistent storage device 42 also stores a set of block identifier structures 78, although, in other embodiments, the block identifier structures 78 are embedded within the segments 74.

Segments 74 are sets of contiguous data blocks 76 of the persistent storage device 42. In one embodiment, the native block size of the system 30 is 8 kilobytes. In such an embodiment, each segment 74 may be made up of 1024 8-kilobyte data blocks 76 for a total size of 8 megabytes. In some embodiments, one data block 76 of a segment may be replaced with a block identifier structure 78, in which case, the 8 megabyte segment 74 would only be able to store 1023 8-kilobyte data blocks 76.

In operation, write commands within a single stream 64 are all written to the same segment 74 as they are received. Because this is a log-structured storage system, the data blocks of the write commands from the stream 64 are written to sequential data blocks 76 of the segment 74. Thus, in segment B74(B), for example, data block 76(B)(1) is filled first, proceeding in order until data block 76(B)(1024) is filled last. Each data block 76 has an associated logical block address (LBA) 80 stored within a block identifier structure 78 for its segment 74. Thus, for example, block identifier structure B 78(B) is associated with segment B 74(B), storing LBAs 80(B)(1) through 80(B)(1024) corresponding to respective data blocks 76(B)(1) through 76(B)(1024) of segment B 74(B). Because this is a log-structured storage system, even if a data block having a particular LBA 80 is deleted or overwritten, a change is not made to the already-written data block 76 within the segment 74. Rather, a new data block 76 is added with the same LBA 80 as the old data block 76, invalidating the previously-written data block 76 without overwriting it. A garbage collection scheme may be used to recover invalidated data blocks 76 once a segment 74 contains a certain number of invalidated data blocks 76. See, for example, U.S. Pat. No. 6,611,852 entitled "SYSTEM AND METHOD FOR CLEANING A LOG STRUCTURE," issued on Aug. 26, 2003, and U.S. patent application Ser. No. 14/767,387 entitled "TECHNIQUES FOR AUTOMATICALLY FREEING SPACE IN A LOG-STRUCTURED STORAGE SYSTEM," filed on Aug. 12, 2015, for garbage collection techniques which may be used. The entire content and teaching of those applications is hereby incorporated herein by this reference.

Although data blocks 76 are stored sequentially within segments 74, the data blocks 76 may logically be arranged in disparate locations as identified by their corresponding LBAs 80. In order to be able to easily read each data block 74 with reference to its LBA 80, map tree 66 is used to index the data blocks 76 by their respective LBAs 80.

Map tree 66 is thus an indexing structure. In one embodiment, map tree 66 may be implemented as a B–tree or a B+tree having three levels: a root node 68, a set of one-deep nodes 70, and a set of leaf nodes 72. Each node 68, 70, 72 contains a set of pointers 69. In the case of root node 68 and one-deep nodes 70, the pointers 69 point to child nodes 70, 72, while in the case of leaf nodes 72, the pointers 69 point to data blocks 76. An LBA 80 may be used to index into the various nodes 68, 70, 72.

Thus, in one example embodiment, persistent storage device 42 may have a logical address space of $2^{50}$ blocks, each LBA 80 being 50 bits in length. In this example embodiment, a data block is 8 kilobytes in size, leading to a total addressable storage space of 8 exabytes. This is much larger than any currently-available storage device, but it allows for thin provisioning. The 30 most significant bits of the LBA 80 may be used to index into the $2^{30}$ pointers 69 of top node 68, each of which may point to a one-deep node 70. The 10 next-most significant bits may be used to index into the $2^{10}$ pointers 69 of a one-deep node 70, and the 10 least significant bits may be used to index into the $2^{10}$ pointers 69 of a leaf node 72. Because of thin provisioning, not every addressable one-deep node 70 and leaf node 72 actually exists on the persistent storage device 42. Only if there are any data blocks 76 with LBAs 80 corresponding to a pointer 69 of a leaf node 72 will that leaf node 72 be allocated, and only if there are any allocated leaf nodes 72 corresponding to a pointer 69 of a one-deep node 70 will that one-deep node 70 be allocated.

When an application 95 attempts to write a block to a particular LBA, I/O module 44 first makes reference to hashing module 48 to find a descriptor 52 for that LBA within cache 50. Hashing module 48 maps particular LBAs to particular addresses within cache 50. In case of a collision between two LBAs that both have the same hash, a linked list structure may be used (not depicted) as is well-known in the art.

Each descriptor 52 stores an LBA 54 for the block and a physical address 56 on the persistent storage device 42 where the data block 76 is stored. The physical address 56 may include a segment identifier or segment number 58 that points to a particular segment 74. The physical address 56 may also include an offset 60 that identifies the position of the data block 76 within the identified segment 74. Each descriptor 52 may also include a dirty flag 61, which may be a binary flag capable of representing a CLEAN state and a DIRTY state. In some embodiments, the data of the data block being written may be cached as cached data block 62 within cache 50, in order to speed later read operations.

When I/O module 44 attempts to process the write operation for a particular LBA 54, it writes the block to a data block 76 within an open segment 74 on persistent storage device 42, also storing the LBA 54 as LBA 80 in a corresponding block identifier structure 78 on the persistent storage device 42, updating the physical address 56 in the descriptor at the same time. I/O module 44 also marks the dirty flag 61 within the descriptor as DIRTY.

I/O module 44 identifies an open segment 74 to write to with reference to the open segment list 82 stored on persistent storage device 42. In some embodiments (not depicted), open segment list 82 is organized to identify which open segment 74 is associated with any given stream 64. In other embodiments (not depicted), there is a separate open segment list 82 for the open segments 74 for each separate stream 64. In some embodiments, open segment list 82 is an ordered list with new open segments 74 always added at one end (e.g., the end) of the open segment list 82.

Once an open segment 74 becomes full (e.g., the last data block 76 within that segment 74 has been written to), that segment 74 may become closed, being removed from the open segment list 82, at which point, the descriptors 52 for all data blocks 76 in that segment 74 are updated to have their dirty flags marked as CLEAN. Map tree insertion module 46 is a background process which iterates through the open segments 74 within the open segment list 82 in first-in-first-out (FIFO) order, sequentially closing all open segments 74 which are full in the order that they were added to the open segment list. Thus, for example, in embodiments having a single open segment list 82 for all streams 64, if the open segment list 82 includes B, C, D, E, F, G, H, I, J, and K in that order and segments B, F, and I are full, then map tree insertion module 46 iterates through the open segment list 82, first closing segment B, then F, and then I. As another example, in embodiments having separate open segment lists 82 for all streams 64, if the open segment list 82 for stream 64(a) includes B, C, D, and E in that order and the open segment list 82 for stream 64(b) includes F, G, H, and I in that order and segments B, C, and F are full, then map tree insertion module 46 iterates through each open segment list 82, first closing segment B and then closing segment C. When iterating through the open segment list 82 for stream 64(b), map tree insertion module 46 closes only segment F.

Map tree insertion module 46 may iterate over the various open segment lists 82 in series (e.g., first iterating through the open segment list 82 for stream 64(a) and then iterating through the open segment list 82 for stream 64(b)) or in parallel (which may involve multiple threads or multiple instances of map tree insertion module 46). In some embodiments, map tree insertion module 46 is able to close a segment on the open segment list 82 even if that segment 74 is still not yet full under certain conditions.

Map tree insertion module 46 closes a segment 74 by adding all non-invalidated data blocks 76 within that segment 74 to the map tree 66, by causing a pointer 69 within leaf node 72 corresponding to the LBA 80 to point to the last (non-invalidated) data block 76 within the segment 74 being processed having that LBA 80 (since all data blocks 76 having the same LBA 80 are invalidated except for the last one). Once this is done for all distinct LBAs 80 within the block identifier structure 78 for that segment 74, that segment 74 is removed from the open list 82. In some embodiments, at this point, the block identifier structure 78 corresponding to that segment 74 may be freed, although in embodiments in which the block identifier structure 78 is stored within the segment 74 itself, the block identifier structure 78 is not deleted or freed. Once the segment 74 is removed from the open list 82, descriptors 52 and cached data blocks 62 for that segment may be paged out of the cache according to well-known techniques (e.g., with reference to a least-recently-used list).

As depicted in FIG. 1, physical address 56(a) of descriptor 52(a) within cache 50 points to data block 76(B)(1024), with segment number 58(a) identifying segment B 74(B) (which is on the open segment list 82) and offset 60(a) identifying position 1024 within that segment 74(B). Since segment B 74(B) is on the open segment list 82, the dirty flag 61(a) is DIRTY, but, because segment B 74(B) is full, map tree insertion module 46 will soon remove segment B 74(B) from the open segment list 82, marking the dirty flag 61(a) as CLEAN at that time.

As also depicted in FIG. 1, physical address 56(b) of descriptor 52(b) within cache 50 points to data block 76(C)(1), with segment number 58(b) identifying segment C 74(C) (which is now on open segment list 82) and offset 60(b) identifying position 1 within that segment 74(C). Since segment C 74(C) is on the open segment list 82, the dirty flag 61(b) is DIRTY.

Figure 2:
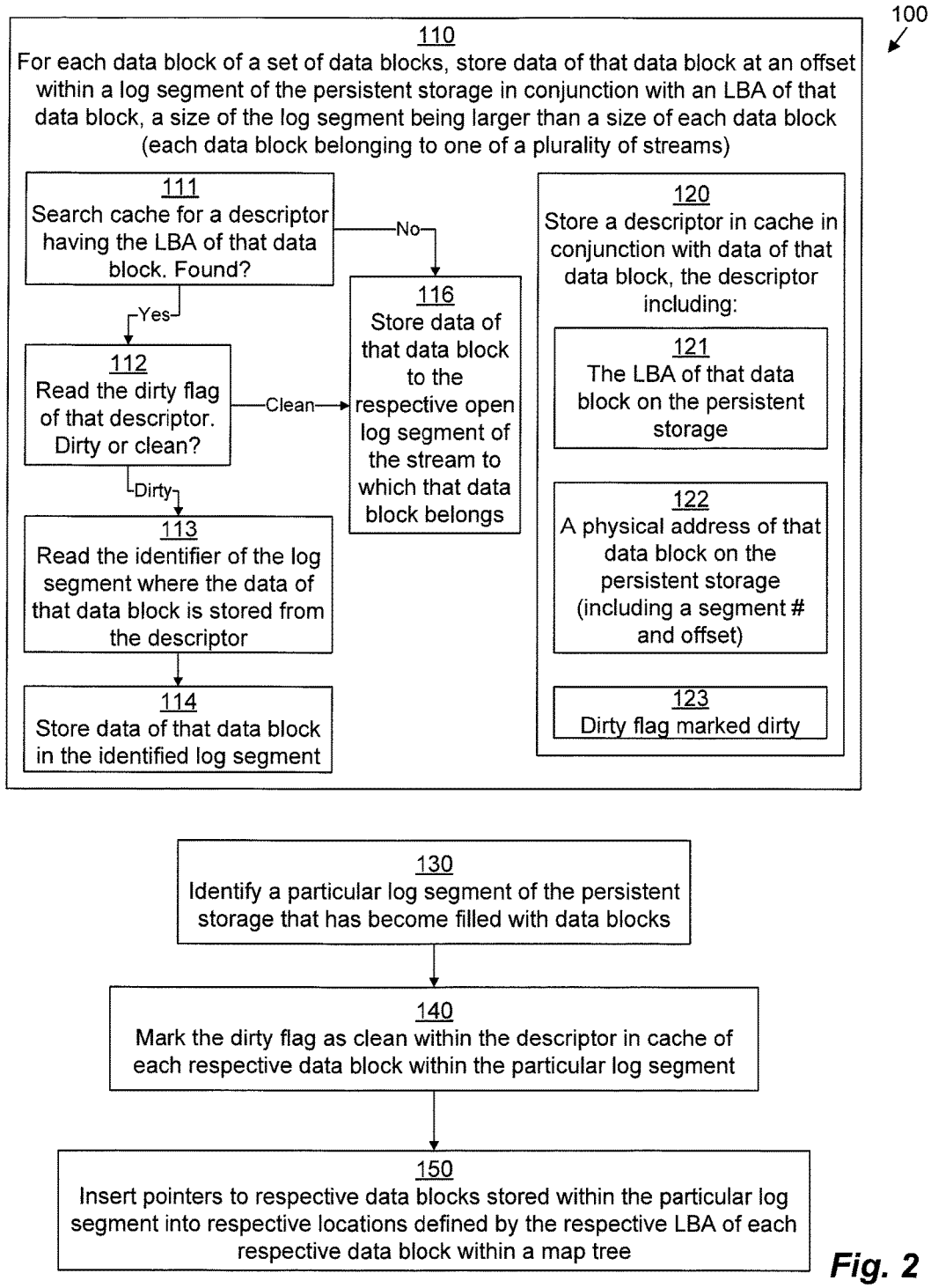
FIG. 2 is a flowchart depicting an example method for use in conjunction with a system such as depicted in FIG. 1 according to various embodiments.

FIG. 2 illustrates an example method 100 performed by system 30 to write data to persistent storage device 42. It should be understood that any time a piece of software (e.g., module 44, 46, 48, etc.) is described as performing a method, process, step, or function, in actuality what is meant is that a computing device (e.g., data storage system 30 or its component storage processor 32; host 90, etc.) on which that piece of software is running performs the method, process, step, or function when executing that piece of software on its processing circuitry 34, 92. It should be understood that although depicted in one order, one or more steps or sub-steps may be combined together or performed in a different order. It should be understood that, in some embodiments, one or more of the steps may be omitted. Similarly, in some embodiments, one or more steps may be combined together or performed in a different order.

In step 110, for each data block 76 of a set of data blocks to be written to persistent storage device 42, I/O module 44 stores data of that data block 76 at an offset 60 within a log segment 74 of the persistent storage device 42 in conjunction with an LBA 80 of that data block 74 (e.g., within a corresponding block identifier structure 78), a size of the log segment 74 being larger than a size of each data block 76 (e.g., the segment size of 8 megabytes is larger than the data block size of 8 kilobytes). Typically, each data block 76 belongs to one stream 64 of a plurality of streams 64.

In some embodiments, step 110 may be performed in connection with sub-steps 111-116 and, in parallel, sub-step 120.

In sub-step 111, I/O module 44 searches the cache 50 for a descriptor 52 having the LBA 54 of the data block being processed. This may be done by hashing the LBA 54 with hashing module 48 to locate a position of the descriptor 52 within the cache 50, following a linked-list if necessary. If no such descriptor 52 is found within cache 50, then I/O module 44 adds such a descriptor 52 (see sub-step 120 below) and proceeds to step 116, in which I/O module 44 stores the data of that data block at the next-available offset within the segment 74 on the persistent storage device 42 that is associated with whatever stream 64 that data block belongs to. This association may be identified with reference to the open segment list 82. Together with storing the data block 76, I/O module 44 also stores the LBA 80 at a corresponding offset of corresponding block identifier structure 78.

If a descriptor 52 is found in step 111, then operation proceeds with sub-step 112, in which I/O module 44 reads the dirty flag 61 of the descriptor 52, checking whether it is CLEAN or DIRTY. If CLEAN, operation proceeds with step 116, as before (modifying the descriptor 52 in accordance with sub-step 120, see below). If DIRTY, operation proceeds with sub-step 113.

In sub-step 113, I/O module 44 reads the segment identifier 58 of the segment 74 where the data of that data block 76 is stored from the descriptor 52. Since the descriptor 52 is DIRTY, a previous version of that data block is already stored within a still-open segment 74, so the new version should be stored to the same still-open segment 74 so that the old version can be automatically invalidated. This is important because trying to invalidate data blocks using time stamps can be problematic if there are inconsistent time domains. Therefore, instead of using time stamps for invalidation, position within a segment 74 is used, invalidating data blocks 76 at earlier offsets if a data block with the same LBA exists at a later offset within that segment 74. If it turns out, however, that the still-open segment 74 that contains the previous version of that data block is already full but has not yet been closed by the map tree insertion module 46, a new segment 74 associated with the same stream may be opened and added to the open segment list 82 at the end. The new version of the data block may then be stored to the new segment 74. This does not pose any order problems because the full segment 76 will always be added to the map tree 66 before the new segment 76 is added to the map tree 66 because of their relative positions on the open segment list 82.

Finally, in sub-step 114, I/O module 44 stores data of that data block at the next-available offset within the identified log segment 74 from sub-step 113 (modifying the descriptor in accordance with sub-step 120, see below). Together with storing the data block 76, I/O module 44 also stores the LBA 80 at a corresponding offset of corresponding block identifier structure 78.

It should be understood that, in some embodiments, in sub-steps 114 and 116, the data of the data block being processed is also stored locally within cache 50 as cached data block 62.

Sub-step 120 details what the I/O module 44 stores within descriptor 52 when adding or updating the descriptor 52. Descriptor 52 is added or updated to include the LBA 54 of the data block being processed (box 121), the physical address 58 of the data block 76 as stored on persistent storage 42 (including the segment number 58 and the offset 60 within the segment 74) (box 122), and a dirty flag marked DIRTY (box 123).

Step 110 may be performed repeatedly by I/O module 44 for any sized set of data blocks. In some embodiments, a multi-block write request may be executed. In such embodiments, it is possible that different blocks of the write request will be within different streams 64. If that is the case, different blocks of the same write request will be processed differently by step 110.

Map tree insertion module 46 may operate in parallel in the background, iterating through the segments 74 on the open segment list 82 in FIFO order, performing steps 130-150. In step 130, after I/O module 44 adds the last data block 76(X)(1024) to a particular data segment 76(X), map tree insertion module 46 (upon reaching that segment 76(X) upon repeatedly iterating through the open segment list 82) identifies that that particular log segment 74(X) has become filled with data blocks 76. At this time, map tree insertion module 46 removes that segment 74(X) from the open segment list 82 and performs steps 140-150 in parallel. In step 140, map tree insertion module 46 closes that segment 74(X) by marking the dirty flag 61 as CLEAN within the descriptor 52 in cache 50 of each respective data block 76 within the particular segment 74(X). In step 150, map tree insertion module 46, operating on the particular segment 74(X) from the open segment list 82, inserts pointers 69 to respective data blocks 76 stored within the particular log segment 74(X) into respective locations (i.e., leaf nodes 72) defined by the respective LBA 80 of each respective data block 76 within the map tree 66 of the persistent storage device 42, adding nodes 70, 72, as needed and as is well-known in the art.

Figure 3:
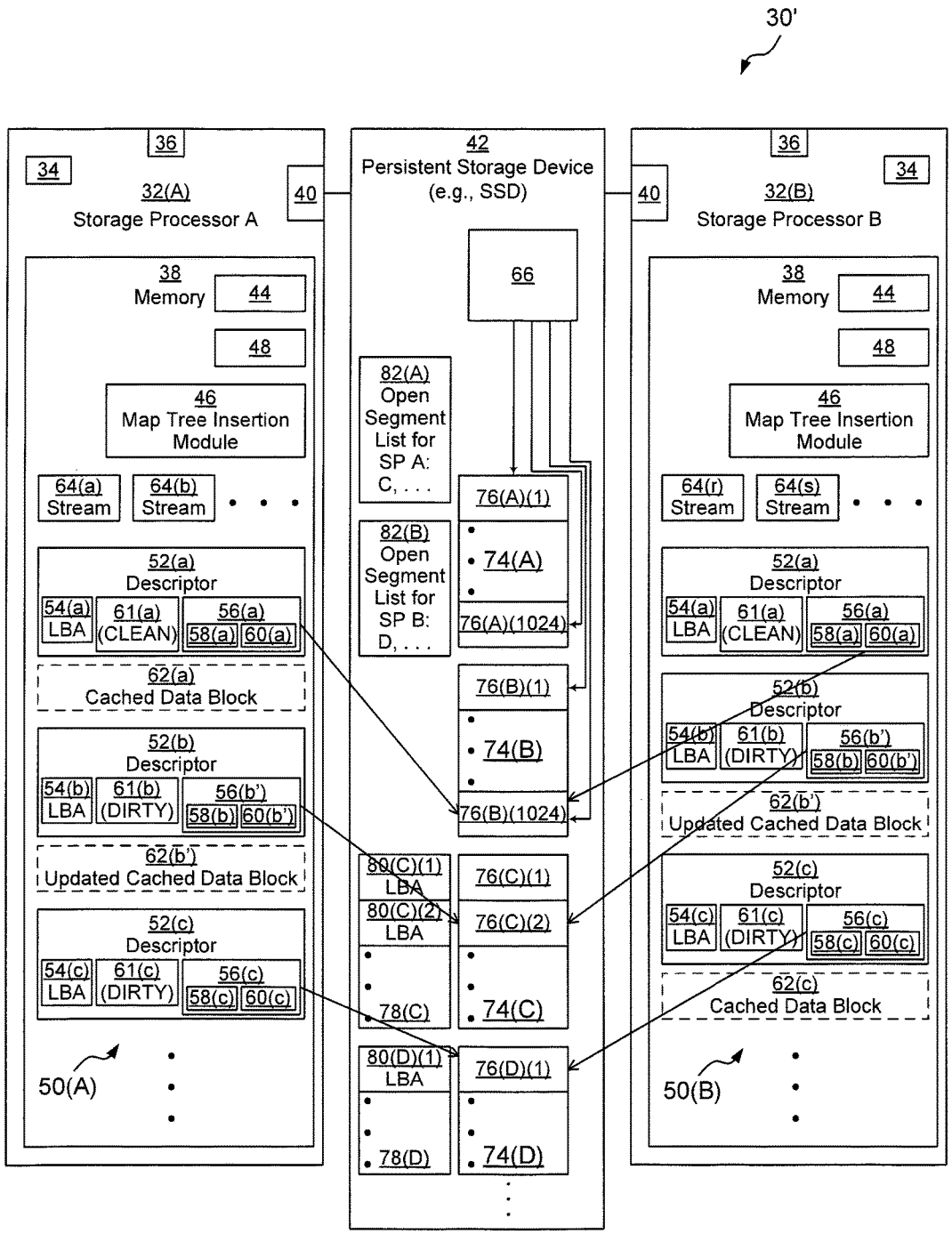
FIG. 3 is a block diagram depicting another example system and apparatus for use in connection with various embodiments.

FIG. 3 depicts another example data storage system 30'. System 30' is similar in many respects to system 30, but there are two storage processors 32(A), 32(B) that are both configured to write to the persistent storage device 42 in an active-active manner (e.g., using ALUA). Storage processor 32(A) is similar to storage processor 32 from FIG. 1, although, as depicted, the contents of the cache 50(A) are somewhat different.

Persistent storage device 42 of FIG. 3 is also similar to as it was depicted in FIG. 1, although the data blocks 76 stored thereon are somewhat different. However, one difference is that instead of only having one open segment list 82, there is now an open segment list 82(A) for storage processor A and an open segment list 82(B) for storage processor B.

Storage processor 32(B) is also generally similar to the storage processor 32 from FIG. 1. It has a different cache 50(B), which, although partially mirrored with cache 50(A), may differ from cache 50(A) in what cached data blocks 62 it maintains. Also, of course, storage processor B include representations of different stream 64 (depicted as streams 64(r), 64(s), . . . ) than does storage processor A.

As depicted in FIG. 3, physical address 56(a) of descriptor 52(a) within both caches 50(A), 50(B) still points to data block 76(B)(1024), with segment number 58(a) identifying segment B 74(B) and offset 60(a) identifying position 1024 within that segment 74(B). However, segment B 74(B) is no longer on the open segment list 82, as can be seen by noting that the map tree 66 now points to the data blocks 76 within segment B 74(B) and by the fact that the block identifier structure 80(B) is no longer associated with segment B 74(B) (although in some embodiments, block identifier structure 80(B) remains in association with segment B 74(B) as long as segment B 74(B) exists). Since segment B 74(B) has now been inserted into the map tree 66 and no other writes have yet been made to the same LBA 54(*a*), the dirty flag 61(*a*) is CLEAN. Since data block 76(B)(1024) was written by SP A 32(A), it may remain cached as cached data block 62(*a*) within cache 50(A), but no cached version exists within cache 50(B).

As also depicted in FIG. 3, physical address 56(*b'*) of descriptor 52(*b*) within cache 50(A) has changed to now point to data block 76(C)(2) rather than 76(C)(1), with segment number 58(*b*) continuing to identify segment C 74(C) (which is now on open segment list 82(A) for SP A) and new offset 60(*b'*) identifying position 2 within that segment 74(C). Since segment C 74(C) is on the open segment list 82, the dirty flag 61(*b*) is DIRTY. As depicted, a new write command for LBA 54(*b*) came in via SP B 32(B) (e.g., on stream 64(*r*)), but, since the dirty flag 61(*b*) was DIRTY and since the segment number 58(*b*) pointed to a segment 74(B) belonging to a stream 64 (e.g., 64(*a*)) on SP A 32(A), storage processor B 32(B) was unable to process that write, instead redirecting that write to stream 64(*a*) on SP A 32(A). Thus, the updated cached data block 62(*b'*) is cached on both SPs 32(A), 32(B).

As also depicted in FIG. 3, physical address 56(*c*) of descriptor 52(*c*) within both caches 50(A), 50(B) now points to data block 76(D)(1), with segment number 58(*c*) identifying segment D 74(D) (which is now on open segment list 82(B) for SP B) and offset 60(*c*) identifying position 1 within that segment 74(D). Because that data block 76(D)(1) was written by SP B 32(B) in response to a data storage command received by a stream 64 (e.g., stream 64(*s*)) of SP B 32(B), it was written to segment 76(D), which is on the open segment list 82(B) for SP B and cached data block 62(*c*) is stored within cache 50(B) but not within cache 50(A).

Figure 4:
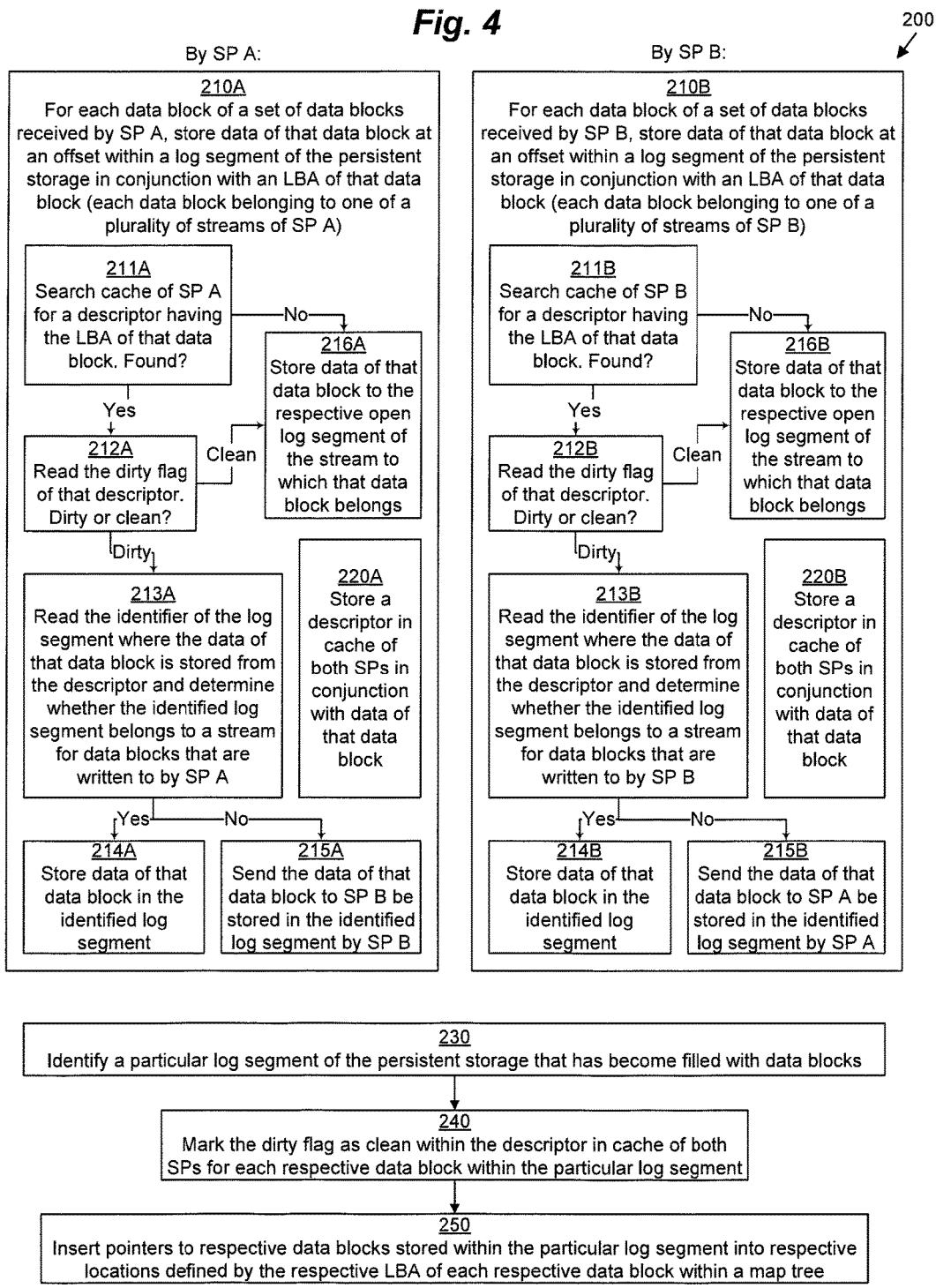
FIG. 4 is a flowchart depicting an example method for use in conjunction with a system such as depicted in FIG. 3 according to various embodiments.

FIG. 4 illustrates method 200, which is a generalization of method 100 as applied to the two storage processor system 30' of FIG. 3. Method 200 includes certain steps and sub-steps on the left side that are performed by storage processor A 32(A) and certain steps and sub-steps on the right side that are performed by storage processor B 32(B), while final step 250 may be performed by either or both of storage processor A 32(A) and storage processor B 32(B).

In step 210A, for each data block 76 of a set of data blocks received by storage processor A 32(A) to be written to persistent storage device 42, I/O module 44 of storage processor A 32(A) stores data of that data block 76 at an offset 60 within a log segment 74 of the persistent storage device 42 in conjunction with an LBA 80 of that data block 74 (e.g., within a corresponding block identifier structure 78), a size of the log segment 74 being larger than a size of each data block 76 (e.g., the segment size of 8 megabytes is larger than the data block size of 8 kilobytes). Each of these data blocks 76 belongs to one stream 64 of a plurality of streams 64(*a*), 64(*b*), etc. of storage processor A 32(A).

In some embodiments, step 210A may be performed in connection with sub-steps 211A-216A and, in parallel, sub-step 220A.

In sub-step 211A, I/O module 44 of storage processor A 32(A) searches the cache 50(A) for a descriptor 52 having the LBA 54 of the data block being processed. This may be done by hashing the LBA 54 with hashing module 48 to locate a position of the descriptor 52 within the cache 50(A), following a linked-list if necessary. If no such descriptor 52 is found within cache 50(A), then I/O module 44 adds such a descriptor 52 (see sub-step 220A) and proceeds to step 216A, in which I/O module 44 of storage processor A 32(A) stores the data of that data block at the next-available offset within the segment 74 on the persistent storage device 42 that is associated with whatever stream 64 that data block belongs to. This association may be identified with reference to the open segment list 82(A) for storage processor A 32(A). Together with storing the data block 76, I/O module 44 of storage processor A 32(A) also stores the LBA 80 at a corresponding offset of corresponding block identifier structure 78.

If a descriptor 52 is found in step 211A, then operation proceeds with sub-step 212A, in which I/O module 44 of storage processor A 32(A) reads the dirty flag 61 of the descriptor 52, checking whether it is CLEAN or DIRTY. If CLEAN, operation proceeds with step 216A, as before (modifying the descriptor 52 in accordance with sub-step 220A). If DIRTY, operation proceeds with sub-step 213A.

In sub-step 213A, I/O module 44 of storage processor A 32(A) reads the segment identifier 58 of the segment 74 where the data of that data block 76 is stored from the descriptor 52. Since the descriptor 52 is DIRTY, a previous version of that data block is already stored within a still-open segment 74, so the new version should be stored to the same still-open segment 74 so that the old version can be automatically invalidated. This is important because trying to invalidate data blocks using time stamps can be problematic if there are inconsistent time domains. Therefore, instead of using time stamps for invalidation, position within a segment 74 is used, invalidating data blocks 76 at earlier offsets if a data block with the same LBA exists at a later offset within that segment 74. In addition, I/O module 44 of storage processor A 32(A) determines whether the identified log segment 74 belongs to a stream 64(*a*), 64(*b*), etc., for data blocks that are written to by SP A 32(A).

If the determination from sub-step 213A is affirmative, then I/O module 44 of storage processor A 32(A) proceeds to sub-step 214A, in which I/O module 44 of storage processor A 32(A) stores data of that data block at the next-available offset within the identified log segment 74 from sub-step 213A (modifying the descriptor in accordance with sub-step 220A). Together with storing the data block 76, I/O module 44 of storage processor A 32(A) also stores the LBA 80 at a corresponding offset of corresponding block identifier structure 78. If it turns out, however, that the still-open segment 74 that contains the previous version of that data block is already full but has not yet been closed by the map tree insertion module 46, a new segment 74 associated with the same stream may be opened and added to the open segment list 82(A) at the end. The new version of the data block may then be stored to the new segment 74. This does not pose any order problems because the full segment 76 will always be added to the map tree 66 before the new segment 76 is added to the map tree 66 because of their relative positions on the open segment list 82(A).

If the determination from sub-step 213A is negative, then I/O module 44 of storage processor A 32(A) proceeds to sub-step 215A, in which I/O module 44 of storage processor A 32(A) sends the data of that data block to SP B 32(B) be stored at the next-available offset within the identified log segment 74 from sub-step 213A by SP B 32(B) (modifying the descriptor in accordance with sub-step 220A). Together with sending the data block 76, I/O module 44 of storage processor A 32(A) also sends the LBA 80 to storage processor B 32(B) to be written at a corresponding offset of corresponding block identifier structure 78. If it turns out, however, that the still-open segment 74 that contains the previous version of that data block is already full but has not yet been closed by the map tree insertion module 46, a new segment 74 associated with the same stream may be opened by SP B 32(B) and added to the open segment list 82(B) at the end. The new version of the data block may then be stored to the new segment 74. This does not pose any order problems because the full segment 76 will always be added to the map tree 66 before the new segment 76 is added to the map tree 66 because of their relative positions on the open segment list 82(B).

It should be understood that, in some embodiments, in sub-steps 214A, 215A, and 216A, the data of the data block being processed is also stored locally within cache 50(A) as cached data block 62. In addition, in some embodiments, in sub-step 215A, the data of the data block being processed is also stored remotely within cache 50(B) as cached data block 62.

In sub-step 220A the I/O module 44 of storage processor A 32(A) stores data within descriptor 52 of both the local cache 50(A) and the cache 50(B) of storage processor B 32(B) when adding or updating the descriptor 52. Similar to step 120, descriptor 52 is added or updated to include the LBA 54 of the data block being processed, the physical address 58 of the data block 76 as stored on persistent storage 42 (including the segment number 58 and the offset 60 within the segment 74), and a dirty flag marked DIRTY.

Step 210A may be performed repeatedly by I/O module 44 of storage processor A 32(A) for any sized set of data blocks. Step 210B is similar to step 210A but performed by storage processor B 32(B), mutatis mutandis. In some embodiments, a multi-block write request may be executed. In such embodiments, it is possible that different blocks of the write request will be within different streams 64. If that is the case, different blocks of the same write request will be processed differently by step 210A or 210B.

Map tree insertion module 46 may operate in parallel in the background on either storage processor 32(A), 32(B) or on both, iterating through the segments 74 on the open segment list 82 in FIFO order, performing steps 230-250. In step 230, after I/O module 44 of either storage processor 32(A) or 32(B) adds the last data block 76(X)(1024) to a particular data segment 76(X), map tree insertion module 46 (upon reaching that segment 76(X) upon repeatedly iterating through the open segment list 82) identifies that that particular log segment 74(X) has become filled with data blocks 76. At this time, map tree insertion module 46 removes that segment 74(X) from whichever open segment list 82(A) or 82(B) it was on and performs steps 240-250 in parallel. In step 240, map tree insertion module 46 closes that segment 74(X) by marking the dirty flag 61 as CLEAN within the descriptor 52 in cache 50(A), 50(B) of both storage processors 32(A), 32(B) of each respective data block 76 within the particular segment 74(X). In step 250, map tree insertion module 46, operating on the particular segment 74(X) from the open segment list 82, inserts pointers 69 to respective data blocks 76 stored within the particular log segment 74(X) into respective locations (i.e., leaf nodes 72) defined by the respective LBA 80 of each respective data block 76 within the map tree 66 of the persistent storage device 42, adding nodes 70, 72, as needed and as is well-known in the art.

If there is a crash of either storage processor 32 or of both storage processors 32(A) and 32(B), the descriptors 52 within cache 50 or caches 50(A) and 50(B) can be reconstituted by replaying all changes, in order, recorded in segments 74 from the open segment list 82 or 82(A) and 82(B) with reference to the LBAs 80 recorded in the block identifier structures 78 corresponding to each respective segment 74. After this is completed, the system 30, 30' can return to normal operation, continuing to accept data storage commands from hosts 90.

Thus, an improved fast log-structured storage system 30, 30' using SSDs without using a non-volatile memory buffer have been presented. This is done by writing blocks 76 directly to log segments 74 on the SSD as writes come in and waiting to insert the blocks 76 into the map tree 66 until the log segments 74 are filled. Further benefits can be obtained by maintaining several open segments 74 in parallel for different streams 64.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. §102 or 35 U.S.C. §103, such determination being a legal determination that depends upon many factors, not all of which are known to Applicant at this time.

What is claimed is:

1. A computer-implemented method performed by a computing device of writing data to persistent storage, the method comprising:
   for each data block of a set of data blocks, storing data of that data block at an offset within a log segment of the persistent storage in conjunction with a logical block address (LBA) of that data block on the persistent storage, a size of the log segment being larger than a size of each data block;
   identifying a particular log segment of the persistent storage that has become filled with data blocks;
   upon identifying the particular log segment as having become filled, inserting pointers to respective data blocks stored within the particular log segment into respective locations defined by the respective LBA of each respective data block within a map tree.

2. The method of claim 1 wherein the method further comprises, for each data block of the set of data blocks, upon storing data of that data block on the persistent storage, storing a descriptor in cache memory of the computing device in conjunction with data of that data block, the descriptor including:
   the LBA of that data block on the persistent storage; and
   a physical address of that data block on the persistent storage, the physical address including an identifier of the log segment where the data of that data block is stored on the persistent storage and an offset within the log segment where the data of that data block is stored.

3. The method of claim 2 wherein the method further comprises:

for each data block of the set of data blocks, upon storing data of that data block on the persistent storage, marking a dirty flag within the descriptor as dirty; and upon identifying the particular log segment as having become filled, marking the dirty flag as clean within the descriptor in cache memory of each respective data block within the particular log segment.

4. The method of claim 3 wherein:

the set of data blocks includes data blocks each belonging to one of a plurality of streams, each stream of the plurality of streams having a respective open log segment to which data blocks belonging to that stream are stored;

for each data block of the set of data blocks, storing the data of that data block at the offset within the log segment of the persistent storage includes:

searching cache memory of the computing device for a descriptor having the LBA of that data block;

if such a descriptor is found, then reading the dirty flag of that descriptor, and if the dirty flag is marked dirty, then reading the identifier of the log segment where the data of that data block is stored from the descriptor and storing data of that data block in the identified log segment; and otherwise, storing data of that data block to the respective open log segment of the stream to which that data block belongs.

5. The method of claim 4 wherein the plurality of streams includes:

a first stream for data blocks that are written to in a random manner; and a second stream for data blocks that are written to in LBA sequence.

6. The method of claim 4 wherein the plurality of streams includes:

a first stream for data blocks that are written to by a first application; and a second stream for data blocks that are written to by a second application, different than the first application.

7. The method of claim 4 wherein the plurality of streams includes:

a first stream for data blocks that are written to by a first processing core; and a second stream for data blocks that are written to by a second processing core, different than the first processing core.

8. The method of claim 4 wherein:

the plurality of streams includes:

a first stream for data blocks that are written to by a first storage processor of the computing device; and a second stream for data blocks that are written to by a second storage processor of the computing device, different than the first storage processor, the first storage processor and the second storage processor each having their own respective separate cache memory; and storing the descriptor in cache memory of the computing device in conjunction with data of that data block includes storing the descriptor in cache memory of both the first storage processor and the second storage processor.

9. The method of claim 8 wherein:

searching cache memory of the computing device for the descriptor having the LBA of that data block includes searching the cache memory of the one of the first storage processor and the second storage processor which is writing that data block; and reading the identifier of the log segment where the data of that data block is stored from the descriptor and storing data of that data block in the identified log segment includes:

determining whether the identified log segment belongs to a stream for data blocks that are written to by the one of the first storage processor and the second storage processor which is writing that data block; and based on the determination, selectively:

if the determination is affirmative, storing, by the one of the first storage processor and the second storage processor which is writing that data block, the data of that data block in the identified log segment; and if the determination is negative, sending, by the one of the first storage processor and the second storage processor which is writing that data block to the other of the first storage processor and the second storage processor, the data of that data block to be stored in the identified log segment by the other of the first storage processor and the second storage processor.

10. A computer program product comprising a non-transitory computer-readable storage medium storing a set of instructions, which, when executed by a computing device, causes the computing device to write data to persistent storage by performing the following operations:

for each data block of a set of data blocks, storing data of that data block at an offset within a log segment of the persistent storage in conjunction with a logical block address (LBA) of that data block on the persistent storage, a size of the log segment being larger than a size of each data block;

identifying a particular log segment of the persistent storage that has become filled with data blocks;

upon identifying the particular log segment as having become filled, inserting pointers to respective data blocks stored within the particular log segment into respective locations defined by the respective LBA of each respective data block within a map tree.

11. An apparatus comprising:

network interface circuitry for connecting to a host device configured to issue write commands for a set of data blocks;

storage circuitry configured to interface with a persistent storage device; and processing circuitry coupled to memory configured to write data to the persistent storage device by performing the following operations:

for each data block of the set of data blocks, storing data of that data block at an offset within a log segment of the persistent storage device in conjunction with a logical block address (LBA) of that data block on the persistent storage device, a size of the log segment being larger than a size of each data block;

identifying a particular log segment of the persistent storage device that has become filled with data blocks;

upon identifying the particular log segment as having become filled, inserting pointers to respective data blocks stored within the particular log segment into respective locations defined by the respective LBA of each respective data block within a map tree.

12. The computer program product of claim 10 wherein the set of instructions, when executed by the computing device, further causes the computing device to, for each data block of the set of data blocks, upon storing data of that data block on the persistent storage, store a descriptor in cache memory of the computing device in conjunction with data of that data block, the descriptor including:
the LBA of that data block on the persistent storage; and
a physical address of that data block on the persistent storage, the physical address including an identifier of the log segment where the data of that data block is stored on the persistent storage and an offset within the log segment where the data of that data block is stored.

13. The computer program product of claim 12 wherein the set of instructions, when executed by the computing device, further causes the computing device to:
for each data block of the set of data blocks, upon storing data of that data block on the persistent storage, mark a dirty flag within the descriptor as dirty; and
upon identifying the particular log segment as having become filled, mark the dirty flag as clean within the descriptor in cache memory of each respective data block within the particular log segment.

14. The computer program product of claim 13 wherein:
the set of data blocks includes data blocks each belonging to one of a plurality of streams, each stream of the plurality of streams having a respective open log segment to which data blocks belonging to that stream are stored;
for each data block of the set of data blocks, storing the data of that data block at the offset within the log segment of the persistent storage includes:
searching cache memory of the computing device for a descriptor having the LBA of that data block;
if such a descriptor is found, then reading the dirty flag of that descriptor, and if the dirty flag is marked dirty, then reading the identifier of the log segment where the data of that data block is stored from the descriptor and storing data of that data block in the identified log segment; and
otherwise, storing data of that data block to the respective open log segment of the stream to which that data block belongs.

15. The computer program product of claim 14 wherein the plurality of streams includes:
a first stream for data blocks that are written to in a random manner; and
a second stream for data blocks that are written to in LBA sequence.

16. The computer program product of claim 14 wherein the plurality of streams includes:
a first stream for data blocks that are written to by a first application; and
a second stream for data blocks that are written to by a second application, different than the first application.

17. The computer program product of claim 14 wherein the plurality of streams includes:
a first stream for data blocks that are written to by a first processing core; and
a second stream for data blocks that are written to by a second processing core, different than the first processing core.

18. The computer program product of claim 14 wherein:
the plurality of streams includes:
a first stream for data blocks that are written to by a first storage processor of the computing device; and
a second stream for data blocks that are written to by a second storage processor of the computing device, different than the first storage processor, the first storage processor and the second storage processor each having their own respective separate cache memory; and
storing the descriptor in cache memory of the computing device in conjunction with data of that data block includes storing the descriptor in cache memory of both the first storage processor and the second storage processor.

19. The computer program product of claim 18 wherein:
searching cache memory of the computing device for the descriptor having the LBA of that data block includes searching the cache memory of the one of the first storage processor and the second storage processor which is writing that data block; and
reading the identifier of the log segment where the data of that data block is stored from the descriptor and storing data of that data block in the identified log segment includes:
determining whether the identified log segment belongs to a stream for data blocks that are written to by the one of the first storage processor and the second storage processor which is writing that data block; and
based on the determination, selectively:
if the determination is affirmative, storing, by the one of the first storage processor and the second storage processor which is writing that data block, the data of that data block in the identified log segment; and
if the determination is negative, sending, by the one of the first storage processor and the second storage processor which is writing that data block to the other of the first storage processor and the second storage processor, the data of that data block to be stored in the identified log segment by the other of the first storage processor and the second storage processor.

20. The apparatus of claim 11 wherein the processing circuitry coupled to memory is further configured to write the data to the persistent storage device by, for each data block of the set of data blocks, upon storing data of that data block on the persistent storage, storing a descriptor in cache memory of the computing device in conjunction with data of that data block, the descriptor including:
the LBA of that data block on the persistent storage device; and
a physical address of that data block on the persistent storage device, the physical address including an identifier of the log segment where the data of that data block is stored on the persistent storage device and an offset within the log segment where the data of that data block is stored.

* * * * *